United States Patent [19]
Bellegarda et al.

[11] Patent Number: 5,544,257
[45] Date of Patent: Aug. 6, 1996

[54] CONTINUOUS PARAMETER HIDDEN MARKOV MODEL APPROACH TO AUTOMATIC HANDWRITING RECOGNITION

[75] Inventors: Eveline J. Bellegarda; Jerome R. Bellegarda, both of Goldens Bridge; David Nahamoo, White Plains; Krishna S. Nathan, New York, all of N.Y.

[73] Assignee: International Business Machines Corporation, Armonk, N.Y.

[21] Appl. No.: 818,193

[22] Filed: Jan. 8, 1992

[51] Int. Cl.⁶ .................................................. G06K 9/00
[52] U.S. Cl. .................... 382/187; 382/186; 382/190; 382/228
[58] Field of Search ................................. 382/13, 36, 69

[56] References Cited

U.S. PATENT DOCUMENTS

| | | | |
|---|---|---|---|
| 3,755,780 | 8/1973 | Sammon et al. | 382/36 |
| 4,003,025 | 1/1977 | Hilliard | 382/69 |
| 4,553,258 | 11/1985 | Chainer et al. | 382/3 |
| 4,783,804 | 11/1988 | Juang | 381/43 |
| 4,819,271 | 4/1989 | Bahl et al. | 381/43 |
| 4,829,577 | 5/1989 | Kuroda et al. | 381/45 |
| 4,977,598 | 12/1990 | Doddington et al. | 381/43 |
| 4,977,599 | 12/1990 | Bahl et al. | 395/2 |
| 5,062,143 | 10/1991 | Schmitt | 382/36 |
| 5,075,896 | 12/1991 | Wilcox | 382/39 |
| 5,165,007 | 11/1992 | Bahl et al. | 395/2 |

FOREIGN PATENT DOCUMENTS

| | | | |
|---|---|---|---|
| 2237917 | 5/1991 | United Kingdom | A61B 5/117 |

OTHER PUBLICATIONS

J. C. Bezdek, et al., "Parametric Estimation for Normal Mixtures", *Patter Recognition Letters*, vol. 3, No. 2, pp. 79–84, Mar. 1985.

A. Kundu et al., "Recognition of handwritten Word: First and Second Order Hidden Markov Model Based Approach", *Pattern Recognition*, vol. 22, No. 3, pp. 283–297, 1989.

"Arabic Reading Machine", *IBM Technical Disclosure Bulletin*, vol. 33, No. 3B, pp. 63–68, Aug. 1990.

Patent Abstracts of Japan, vol. 15, No. 316 (P–1237), Aug. 13, 1991, and JP–A–03 113 571, Nippon Telegr. & Teleph. Corp., May 14, 1991.

K. Laskey, "A Bayesian Approach to Clustering and Classification", Proceedings of the 1991 IEEE Conference on Systems, Man and Cybernetics, Cat. No. 91CH3067-6, vol. 1, pp. 179–183, Oct. 1991.

*Primary Examiner*—Leo Boudreau
*Assistant Examiner*—D. R. Anderson
*Attorney, Agent, or Firm*—Sterne, Kessler, Goldstein & Fox P.L.L.C.; Robert P. Tassinari, Jr.

[57] ABSTRACT

A computer-based system and method for recognizing handwriting. The present invention includes a preprocessor, a front end, and a modeling component. The present invention operates as follows. First, the present invention identifies the lexemes for all characters of interest. Second, the present invention performs a training phase in order to generate a hidden Markov model for each of the lexemes. Third, the present invention performs a decoding phase to recognize handwritten text. Hidden Markov models for lexemes are produced during the training phase. The present invention performs the decoding phase as follows. The present invention receives test characters to be decoded (that is, to be recognized). The present invention generates sequences of feature vectors for the test characters by mapping in chirographic space. For each of the test characters, the present invention computes probabilities that the test character can be generated by the hidden Markov models. The present invention decodes the test character as the recognized character associated with the hidden Markov model having the greatest probability.

26 Claims, 7 Drawing Sheets

W1 | B | O | X | | D | I | S | C | R | E | T | E |

W2 SPACED DISCRETE

W3 RUN ON DISCRETE

W4 Cursive Writing

W5 Mixed Cursive and Discrete Unconstrained

CONTINUOUS PARAMETER HIDDEN MARKOV MODEL APPROACH TO AUTOMATIC HANDWRITING RECOGNITION

TECHNICAL FIELD

The present invention relates generally to systems and methods for signal processing, and more particularly to systems and methods for handwriting recognition.

BACKGROUND ART

Automatic systems purporting to recognize cursive script writing, or even handwritten characters, have so far met with only limited success. The reason for that can be traced largely to the lack of robustness exhibited by the templates used in the modeling of handwriting. For example, reference is made to U.S. Pat. No. 4,731,857 to Tappert which describes an elastic matching approach for the recognition of run-on handwritten characters.

Tappert teaches three steps. First, potential segmentation points are derived. Second, all combinations of the segments that could reasonably be a character are sent to a character recognizer to obtain ranked choices and corresponding scores. Third, the character sequences are combined so that the best candidate word wins.

Tappert's recognition algorithm itself is a template matching algorithm based on dynamic programming. Each template is a fully formed character presumably representative of the writer's average way of forming this character, and the elastic matching scores of the current character are computed for each template. This strategy is vulnerable to the extensive variability that can be observed both across writers and across time.

In an article entitled "Design of a Neural Network Character Recognizer for a Touch Terminal" by Guyon et al. (*Pattern Recognition*), a neural network is employed to classify (and thereby recognize) input characters. This results in a relatively robust algorithm but requires a large amount of data and is expensive to train.

A prior patent application entitled, "A Statistical Mixture Approach To Automatic Handwriting Recognition," filed by Bellegarda et al., Atty. Docket No. YO991-119, is directed to a fast algorithm for handwriting recognition having an acceptable degree of robustness. Bellegarda's prior application Ser. No. 07/785,642, now U.S. Pat. No. 5,343,537, entails at least three crucial specifications: (i) the feature elements should be chosen such as to characterize handwriting produced in a discrete, run-on, cursive, or unconstrained mode equally well; (ii) these feature elements should be suitably processed so as to minimize redundancy and thereby maximize the information represented on a per-parameter basis; and (iii) the resulting feature parameters should be further analyzed to detect broad trends in handwriting and enable appropriate modeling of these trends. These specifications are not met by the elastic matching approach taught by Tappert, since (i) it is character-based, and (ii) it simply averages several instances of a character to obtain a character template.

According to Bellegarda's prior application Ser. No. 07/785,642, now U.S. Pat. No. 5,343,537, the signal processing front-end is a great deal more sophisticated than that of elastic matching. Rather than merely chopping the input data into segments, the signal is transformed onto a higher dimensional feature space (chirographic space), whose points represent all raw observations after non-redundant feature extraction. Using a Gaussian (as opposed to Euclidean) measure for a more refined clustering, the prototypes in this space are formed for robustness purposes. Hence, each prototype represents a small building block which may be common to many characters. Instead of character sequences, building block sequences are combined, each of which is assigned a true likelihood defined on a bona fide probability space (as opposed to just a distance score). Finally, the recognition algorithm itself is a maximum a posteriori decoder operating on this probability space.

The formulation described in Bellegarda's prior application Ser. No. 07/785,642 may be alternatively cast in terms of multi-arc, single state, hidden Markov models. This formulation, while being robust, may not adequately model the intra-character variation of the alphabet.

DISCLOSURE OF INVENTION

The present invention is directed to a system and method for recognizing handwriting. In particular, the present invention is directed to a computer program for recognizing handwriting.

The present invention includes a pre-processor, a front end, and a modeling component. The present invention operates as follows. First, the present invention identifies the lexemes for all characters of interest. The lexemes represent different writing styles for the same character. Second, the present invention performs a training phase in order to generate a hidden Markov model for each of the lexemes. Third, the present invention performs a decoding phase to recognize handwritten text.

The present invention performs the training phase as follows. The present invention receives sample characters, wherein the sample characters are represented by training observation sequences. The present invention sorts the sample characters according to the lexemes by mapping the sample characters in lexographic space to find high-level variations in the sample characters. Then, for each of the lexemes, the present invention generates sequences of feature vectors for the sample characters associated with respective lexemes by mapping in chirographic space. Next, the present invention generates a hidden Markov model for each of the lexemes. The hidden Markov models are generated by initializing model parameters and then updating the model parameters.

The present invention initializes the model parameters as follows. The present invention sets a length for each of the hidden Markov models. Then, the present invention initializes state transition probabilities of the hidden Markov models to be uniform. Next, the present invention ties the output probability distributions for the emission transitions for each of the states. Also, the present invention assigns a Gaussian density distribution for each codebook for each of the states.

The present invention updates the model parameters by performing Viterbi alignment of the observation sequences in order to update the model parameters (that is, the output distributions, mixture coefficients, and state transition probabilities).

The present invention performs the decoding phase as follows. The present invention receives test characters to be decoded (that is, to be recognized). The present invention generates sequences of feature vectors for the test characters by mapping in chirographic space. For each of the test characters, the present invention computes probabilities that the test character can be generated by the hidden Markov models. The present invention decodes the test character as the character associated with the hidden Markov model having the greatest probability.

The foregoing and other objects, features and advantages of the invention will be apparent from the following more particular description of preferred embodiments of the invention, as illustrated in the accompanying drawings.

BRIEF DESCRIPTION OF DRAWINGS

The present invention will be described with reference to the accompanying drawings, wherein.

BEST MODE FOR CARRYING OUT THE INVENTION

1. Overview of the Present Invention

Figure 1:
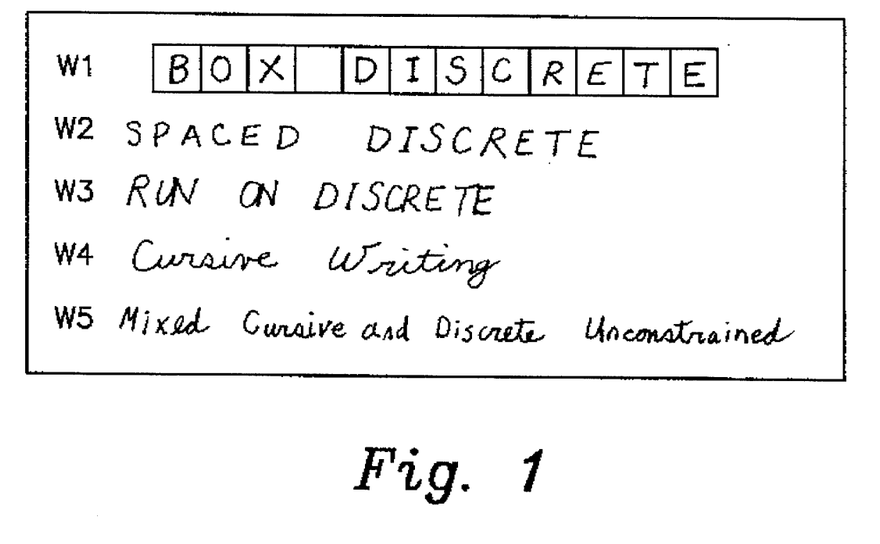
FIG. 1 illustrates handwritten character groups.

In handwriting recognition, handwritten characters generally fall into five groups depicted in FIG. 1, the groups being depicted in increasing order of recognition complexity. Specifically, these groups include a first type of writing (W1) known as box discrete wherein individual characters are formed within predefined areas, or boxes, thereby simplifying the task of character segmentation. A second type of writing (W2) is known as spaced discrete wherein the user of the present invention intentionally forms each character such that no character touches another. A third type of writing (W3) is known as run-on discrete wherein the user may form characters that touch, or "run-on" to, one another. A fourth type of writing (W4) is cursive writing wherein the user normally writes the whole word and subsequently crosses the t's and dots the i's and j's. Finally,, a fifth type of writing (W5) is unconstrained writing wherein the user may use a mixture of run-on and cursive writing. This last type is the most difficult and presents the most complex segmentation and recognition task of the five styles depicted in FIG. 1.

Figure 2:
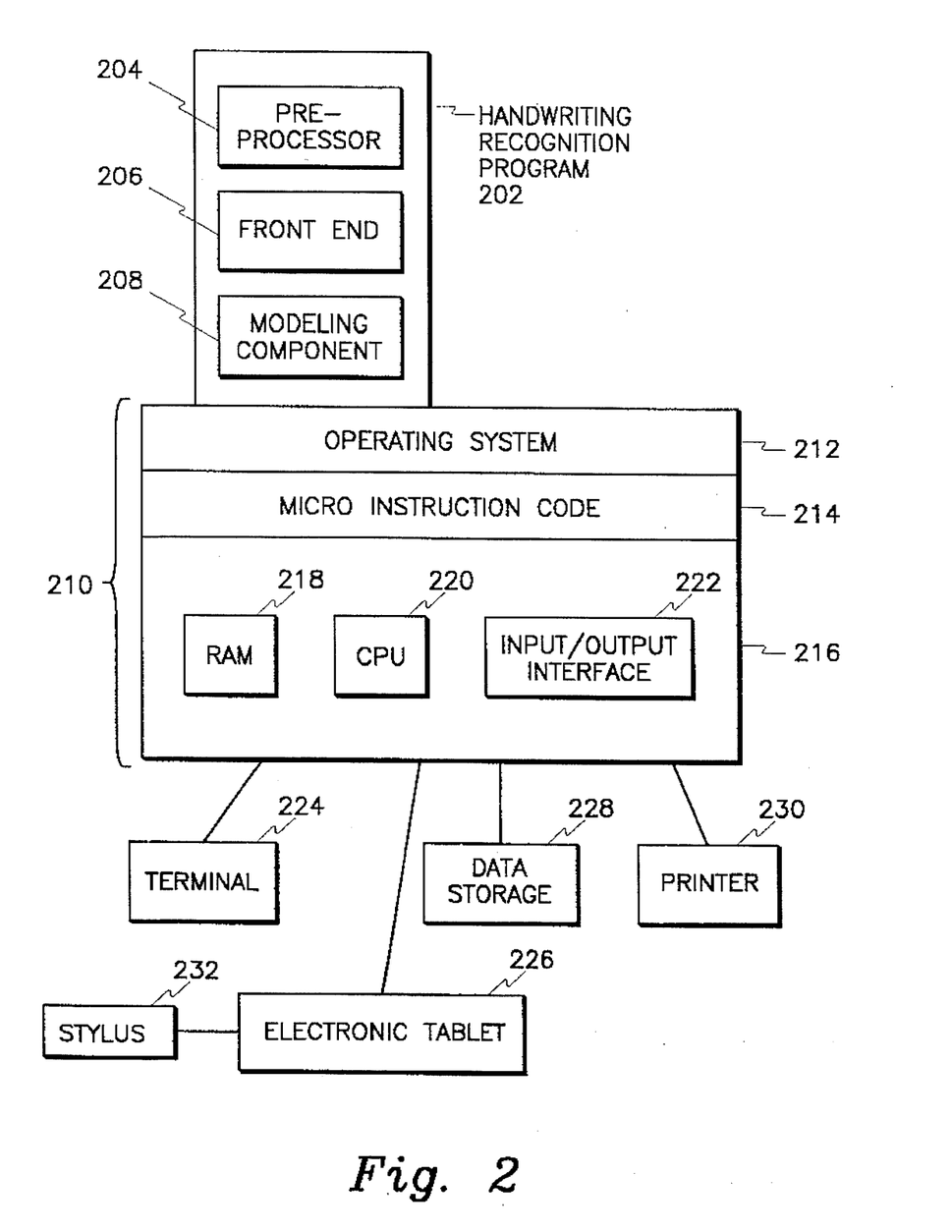
FIG. 2 illustrates a hardware environment in which the present invention may operate.

FIG. 2 illustrates a hardware environment in which the present invention may operate. The hardware environment includes a computer platform 210. The computer platform 210 has hardware elements 216, such as a random access memory (RAM) 218, a central processing unit (CPU) 220, and an input/output interface 222. The computer platform 210 also has an operating system 212, and may have micro instruction code 214.

According to the preferred embodiment, the computer platform 210 is an IBM 3090/VF or an IBM RS 6000. The operating system 212 is any operating system adapted for use with the IBM 3090/VF or IBM RS 6000.

Connected to the computer platform are a number of peripherals, such as a terminal 224, an electronic writing tablet 226 (having a stylus 232), a data storage device 228, and a printer 230. These elements are all well known in the art.

Operating on the computer platform 210 is a handwriting recognition program 202 of the present invention. The handwriting recognition program 202 includes a preprocessor 204, a front end 206, and a modeling component 208. While the present invention is described herein as a computer program, note that the present invention could be implemented in hardware only, or as a combination of hardware and software.

Figure 3:
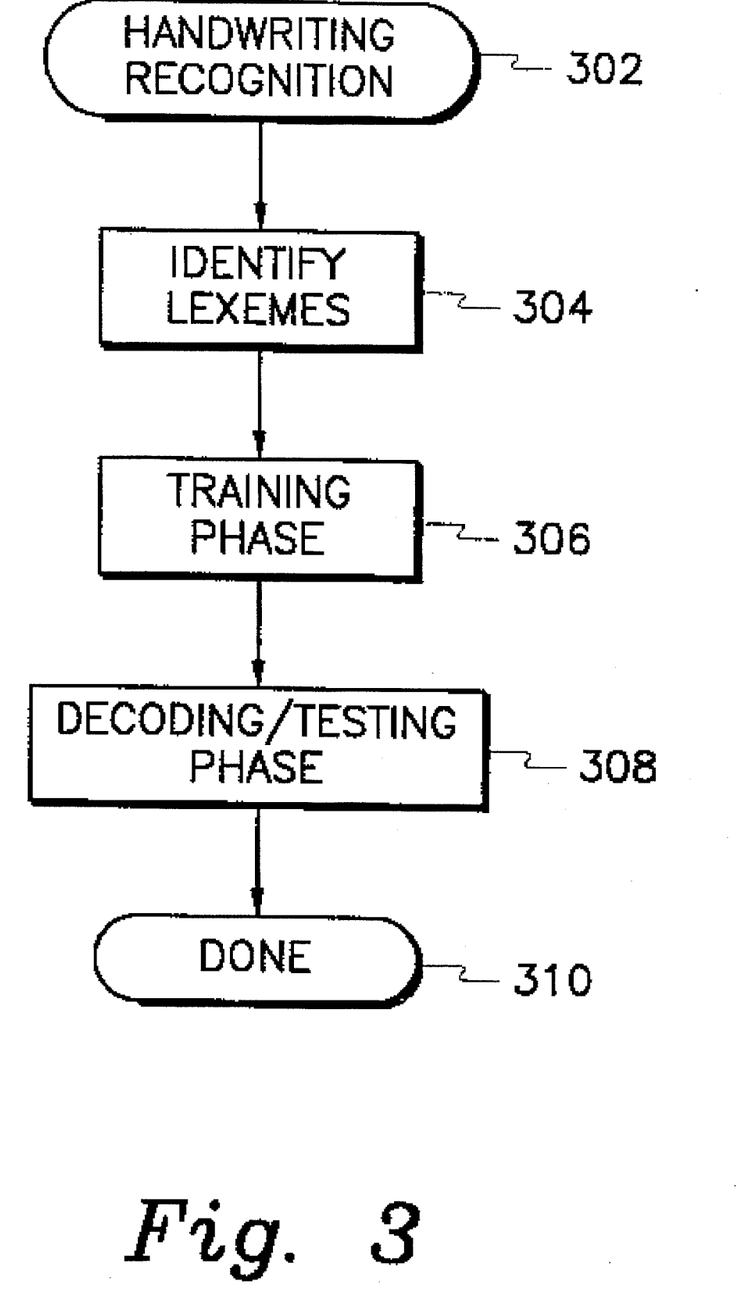
FIG. 3 illustrates a handwriting recognition flowchart which represents the operation of the handwriting recognition program of the present invention.

FIG. 3 illustrates a handwriting recognition flowchart 302 which represents the operation of the handwriting recognition program 202.

In step 304, all possible lexemes for all characters of interest are identified. For example, the characters of interest may be all upper case characters, all lower case characters, all digits, and certain punctuation characters.

Figure 6:
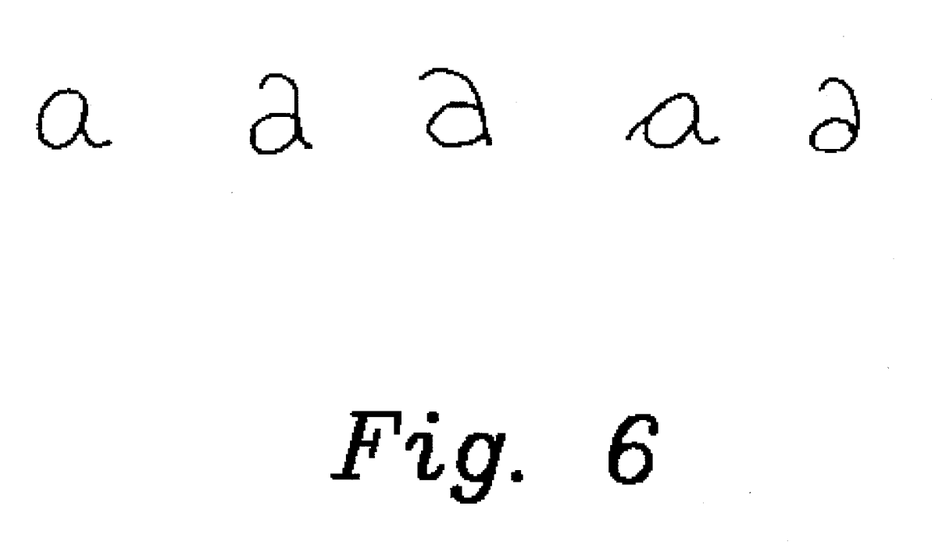
FIG. 6 shows five different lexemes for writing the character "a"

Lexemes represent different styles for writing characters. Different lexemes of the same character represent significant differences in writing styles. For example, different lexemes may differ in shape, in the direction of pen movement of a stroke, or even in the number of strokes. FIG. 6 shows five different lexemes (that is, different writing styles) for writing the character "a". Note that for a given writer, it is typically possible to identify two, or perhaps three, lexemes per discrete character.

Figure 7:
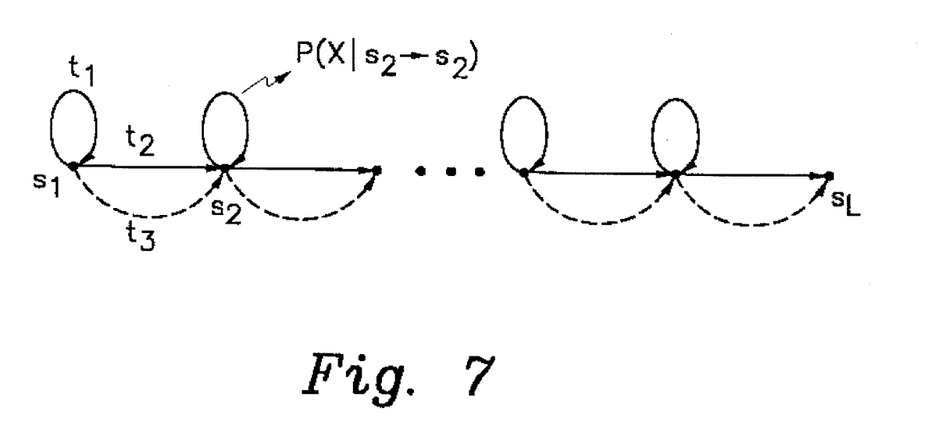
FIG. 7 illustrates an example of a hidden Markov model.

In step 306, the handwriting recognition program 202 represents each lexeme in terms of a left-to-right hidden Markov model (HMM). FIG. 7 illustrates an example of a HMM.

Referring to FIG. 7, the nodes labeled $s_1 \ldots s_L$ represent the states of the HMM. Associated with each state is a set of transitions denoted in FIG. 7 by $t_1$, $t_2$ and $t_3$. These transitions govern the path taken through the sequence of states. The transitions labeled $t_1$ and $t_2$ result in the emission of an observation feature vector while that labeled $t_3$ is a null transition and results in no output. The state transition probabilities, $p(s_i, t_j)$ (which are equivalent to $p(s_i \rightarrow s_i)$ for $t_1$ and $p(s_i \rightarrow s_{i+1})$ otherwise), and the output probability distributions $p(x_i | s_i \rightarrow s_j)$, specify the HMM.

Referring again to FIG. 3, in step 308 the handwriting recognition program 202 receives text from a user and decodes the text by calculating, for each character in the text, the a posteriori (that is, empirical) probability based on the lexeme models which were determined in step 306. The decoded character is that character corresponding to the lexeme with the greatest a posteriori probability.

The training phase 306 and the decoding/testing phase 308 are described in greater detail below.

2. Training Phase

Figure 4:
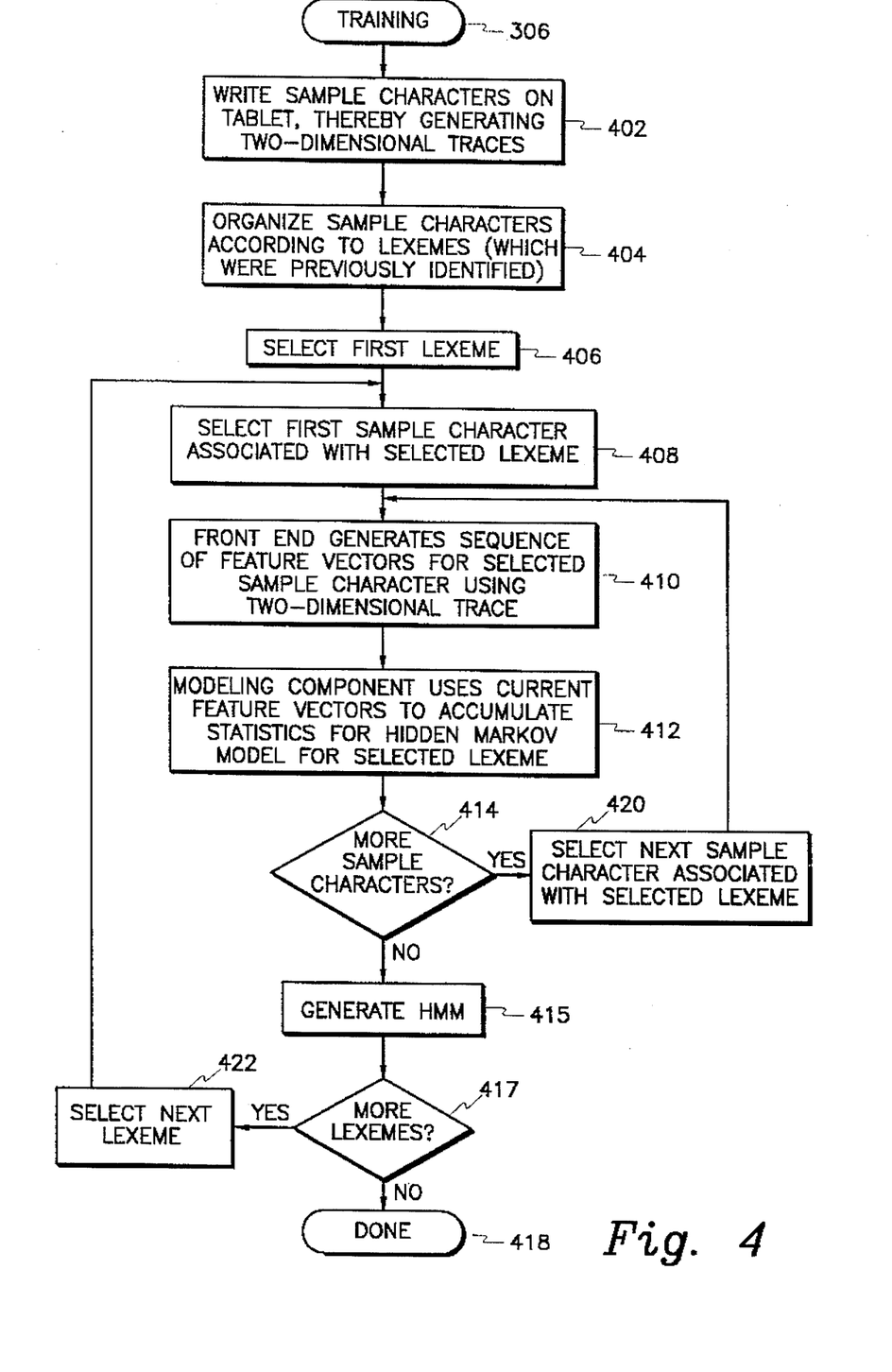
FIG. 4 illustrates the operation of the present invention during a training phase.

FIG. 4 illustrates the operation of step 306 in greater detail.

In step 402, the computer platform 210 receives character or stroke information produced by a user using the stylus 232 to write on the electronic tablet 226. The character or stroke information may be displayed on the electronic tablet 226 or another display device, such as the terminal 224.

The character or stroke information produced by the user are also called sample characters or observations of characters. The sample characters which the user produces during this phase are collectively called training data. The training data are received by the handwriting recognition program 202 in the form of two-dimensional traces (that is, sequences of (x,y) coordinates).

In step 404, the preprocessor 204 organizes the sample characters according to the lexemes which were identified in step 304 (see FIG. 3). Specifically, the preprocessor 204 creates a bin for each lexeme. During step 404, the preprocessor 204 allocates the sample characters to the lexeme bins. The manner in which the preprocessor 204 operates during step 404 is described in greater detail in Section 2.1, below.

In step 406, the handwriting recognition program 202 selects the first lexeme (that is, the first bin) to process.

In step 408, the handwriting recognition program 202 selects the first sample character associated with the selected lexeme. In other words, the handwriting recognition program 202 selects the first sample character in the bin selected in step 406.

In step 410, the front end generates a sequence of feature vectors for the selected sample character using the two-dimensional trace associated with the selected sample character. During step 410, the front end 206 splices the entire data set to obtain feature vectors and a covariance matrix. Analysis of the covariance matrix yields eigenvectors that are used to project the data onto a lower dimensional, more orthogonal space, called the chirographic space. The operation of the front end 206 during step 410 is further described in Section 2.2, below.

In step 412, the modeling component 208 uses the feature vectors associated with the selected lexeme to accumulate statistics which are later used to generate a hidden Markov model for the selected lexeme. During step 412, the modeling component 208 estimates the state transition probabilities, mixture coefficients, and output probability distributions as well as the number of states in the hidden Markov model for the selected lexeme. The operation of the modeling component 208 during step 412 is further described in Section 2.3, below.

In step 414, the handwriting recognition program 202 determines whether there are any more sample characters in the selected lexeme bin. If there are more sample characters, then the handwriting recognition program 202 performs step 420. Otherwise, the handwriting recognition program 202 performs step 415.

In step 420, the handwriting recognition program 202 selects the next sample character in the selected lexeme bin and then jumps back to step 410 to process the newly-selected sample character.

In step 415, the modeling component 208 uses the statistics accumulated in step 412 to generate a hidden Markov model for the selected lexeme.

In step 417, the handwriting recognition program 202 determines whether there are any more lexemes to process. If there are more lexemes to process, then the handwriting recognition program 202 performs step 422. Otherwise, the training step 306 is complete.

In step 422, the handwriting recognition program 202 selects the next lexeme and then jumps back to step 408 to process the newly-selected lexeme.

2.1 Step 404: Organize Sample Characters According To Lexemes

According to the present invention, in step 404 the preprocessor 204 performs a fully automated procedure for (i) producing an objective, data-driven, morphologically motivated alphabet of lexemes, and (ii) consistently annotating handwriting data with this alphabet, i.e., using the same measure as was employed to derive the alphabet itself.

To achieve (i), the preprocessor 204 maps each observation of each character seen in the training data into a point in a suitable high-dimensional space called the lexographic space. Note that this space is only marginally related to the chirographic space described in detail below with regard to step 410. Specifically, the chirographic space is populated by frame-level feature vectors while the lexographic space contains only character-level feature vectors. As a result, the lexographic space is more appropriate for finding the high-level variations characterizing lexemes.

To achieve (ii), the preprocessor 204 performs the annotation in the same lexographic space as defined in (i). Since, for a given character, lexemes represent a partition of the associated lexographic space into regions which correspond to different ways of writing this character, corpus annotation can be done simply after evaluating the contribution of each cluster to the current observation.

The operation of the preprocessor 204 during step 404 is described further below. Specifically, for each character in the training data, the preprocessor 204 performs the following steps.

1. The preprocessor 204 performs steps 2–5 for each observation $o_i$ of the current character in the training data.

2. The preprocessor 204 determines the sequence of points $\{P_n\}$ (each of coordinates $(x_n, y_n)$) for $n=1, \ldots, N$, which has been captured for this observation. Note that N therefore varies from observation to observation.

3. The preprocessor 204 interpolates the sequence of points $\{P_n\}$ as necessary to form the sequence of points $\{P'_n\}$, for $n=1, \ldots, M$, where M is fixed for all the observations. The preferred embodiment for this interpolation is with cubic splines rather than linear segments. A good choice for M is 50.

4. For each point $\{P'_n\}$ so obtained, the preprocessor 204 forms a P-dimensional vector $\vec{P}_n$ of feature elements representative of the local pen trajectory around $P'_n$. For example, a good choice for P is 6.

5. The preprocessor 204 of the present invention constructs a Q-dimensional spliced vector $\vec{S}_i$ by concatenating together the M vectors $\vec{P}_n$ found in Step 3. This is realizable provided that: $Q=M*P$.

6. After computing the covariance matrix S of all the spliced vectors $\vec{S}_i$ obtained in Step 5, the preprocessor 204 computes E, the eigenvector matrix of S and $\Lambda$, which represents the diagonal matrix of corresponding eigenvalues. Since these quantities obey the relationship: $S = E\Lambda E^T$, where $^T$ denotes transposition, the leading eigenvectors in E correspond to the leading eigenvalues in $\Lambda$.

7. The preprocessor 204 performs Step 8 for each observation $o_i$ of the current character in the training data.

8. Using the R leading eigenvectors from Step 6, the preprocessor 204 projects the Q-dimensional feature vectors $\vec{S}_i$ onto a space of dimension R. Call the resulting vectors $\vec{r}_i$. A reasonable value for R is 40. At this point the redundancy present in the Q-dimensional spliced feature vectors has been eliminated by concentrating on the most informative feature elements. This completes the mapping of each observation into a point in a R-dimensional space, called the lexographic space.

9. Starting with random cluster assignments, the preprocessor 204 performs K-means Euclidean clustering of the projected vectors $\vec{r}_i$ obtained in Step 8, so as to obtain preliminary lexeme distributions in the lexographic space.

10. Starting with the preliminary lexeme distributions of Step 9, the preprocessor 204 performs K-means Gaussian clustering of the projected vectors $\vec{r}_i$ obtained in Step 8, so as to obtain final Gaussian lexeme distributions $\pi_k$ in the lexographic space. These distributions define all the lexemes of the current character.

11. Distributions that are sparsely populated, i.e., those that represent a very small number of the vectors $\vec{r}_i$ in step 8, are discarded. This allows for the exclusion of samples in the training data that do not correspond to useful lexemes. A reasonable threshold is 2% of the total number of characters.

12. The preprocessor 204 repeats Steps 2–5 and 8 for each observation $o_i$ of the current character, if different from the training data used above. This ensures that the new feature vectors are in the same lexographic space as the training data.

13. Using the Gaussian distributions from Step 10, the preprocessor 204 computes for all new vectors $\vec{r}_i$ obtained in Step 11, the quantity:

$$\pi_j = \arg\max_k Pr(\vec{r}_i | \pi_k)$$

which corresponds to the lexeme identity which is the closest to the observation $o_i$ represented by the vector $\vec{r}_i$. This completes the annotation process.

2.2 Step 410: Front End Generates Sequence of Feature Vectors For Selected Sample Character Using Two-Dimensional Trace The front end 206 implements the following algorithm while performing step 410.

1. The front end 206 performs a pre-filtering of the data to normalize for the speed of writing. This is accomplished by converting the time-dependent representation captured by the tablet, where the spacing between points is ballistic in nature, into a time-independent representation, where all the points are equally spaced. Linear-interpolation is performed as necessary to find the resulting equally spaced points. If desired, a cubic spline interpolation can also be performed for a more refined interpolation.

2. For each point $P_n$ of coordinate $(x_n, y_n)$ in the training data, the front end 206 forms a P-dimensional vector $\vec{P}_n$ of feature elements representative of the local pen trajectory around $P_n$. For example, a good choice for P is 6, with feature elements given by: (i) the horizontal and vertical incremental changes:

$$\Delta x_n = x_n - x_{n-1}, \Delta y_n = y_n - y_{n-1};$$

(ii) the sine and cosine of the angle of the tangent to the pen trajectory at $P_n$:

$$\cos\theta_n = \Delta X_n / \sqrt{(\Delta X_n)^2 + (\Delta y_n)^2},$$

$$\sin\theta_n = \Delta y_n / \sqrt{(\Delta X_n)^2 + (\Delta y_n)^2}$$

and (iii) the incremental changes in the above two parameters:

$$\Delta\cos\theta_n = \cos\theta_{n+1} - \cos\theta_{n-1}, \Delta\sin\theta_n = \sin\theta_{n+1} - \sin\theta_{n-1}$$

Note that the last parameters provide information about the curvature of the pen trajectory at point $P_n$.

3. For each point $P_n$ of coordinates $(x_n, y_n)$ in the training data, the front end 206 forms a P'-dimensional vector $\vec{P}'_n$ of feature elements representative of the global pen trajectory up to $P_n$. For example, a good choice for P' is 3, with feature elements given by: (i) the height from the baseline $y_n$, (ii) the width from the beginning of the stroke $x_n - x_i$, where $x_i$ is the first coordinate of the current stroke, and (iii) the inter-stroke distance if the current character is composed of more than one stroke.

4. For each stroke in the training data, the front end 206 determines a subset of the points $P_n$ in that stroke, say $Q_i$, with the property that the $Q_i$'s are approximately equally spaced. This set should always include the first and last points of each stroke, and the spacing interval should be some reasonable function of the line height.

5. At each location $Q_i$ obtained in Step 4, the front end 206 constructs a Q-dimensional spliced vector by concatenating together the H vectors $\vec{P}_n$ preceding $Q_i$, the vector $\vec{q}_i$ corresponding to $Q_i$, and the H vectors $\vec{P}_n$ following $Q_i$. Similarly, construct a Q'-dimensional spliced vector by concatenating together the H' vectors $\vec{P}'_n$ preceding $Q_i$, the vector $\vec{q}'_i$ corresponding to $Q_i$ and the H' vectors $\vec{P}'_n$ following $Q_i$. This is realizable provided the following holds:

$$Q = P(2H+1), Q' = P'(2H'+1)$$

Good choices are $H = H' = 20$, yielding values $Q = 246$ and $Q' = 123$.

6. The front end 206 computes the mean vector and covariance matrix of all the Q-dimensional vectors corresponding to local handwriting features. Denote these as $M_t^{(1)}$ and $S_t^{(1)}$, respectively. Similarly, compute the mean vector and covariance matrix of all the Q'-dimensional vector corresponding to global handwriting features. Denote these as $M_t^{(2)}$ and $S_t^{(2)}$, respectively.

7. For $n = 1, 2$, the front end 206 computes $E_t^{(n)}$, the eigenvector matrix of $S_t^{(n)}$, and $\Lambda_t^{(n)}$, the diagonal matrix of corresponding eigenvalues. Note that these quantities obey the relationship:

$$S_t^{(n)} = E_t^{(n)} \Lambda_t^{(n)} E_t^{(n)T},$$

where T denotes matrix transposition. Thus, the leading eigenvectors in $E_t^{(n)}$ correspond to the leading eigenvalues in $\Lambda_t^{(n)}$.

8. Using the $R_1$ leading eigenvectors from Step 7, the front end 206 projects the Q-dimensional feature vectors of Step 5 onto a space of dimension $R_1$. Call the resulting vectors $\vec{r}_i^{(1)}$. A reasonable value for $R_1$ is 6. At this point the redundancy present in the Q-dimensional spliced feature vectors has been eliminated by concentrating on the most informative feature elements. We call the space spanned by the vectors $\vec{r}_i^{(1)}$ the chirographic space $C^{(1)}$.

9. Similarly, using the $R_2$ leading eigenvectors from Step 7, the front end 206 projects the Q'-dimensional feature vectors of step 5 onto a space of dimension $R_2$, with resulting vectors $\vec{r}_i^{(2)}$. A reasonable value for $R_2$ is 15. Note that $R_2 > R_1$ because there is generally less redundancy present in the (global features) Q-dimensional spliced feature vectors than in the (local features) Q-dimensional spliced feature vectors The space spanned by the vectors $\vec{r}_i^{(2)}$ is called the chirographic space $C^{(2)}$.

The operation of the front end 206 during step 410 is further described in a pending patent application entitled "A Statistical Mixture Approach to Automatic Handwriting Recognition," by Bellegarda et al. Ser. No. 07/785,642, now U.S. Pat. No. 5,343,537, which is herein incorporated by reference in its entirety.

2.3 Step 412: Modeling Component Uses Current Feature Vectors To Accumulate Statistics For Hidden Markov Model For Selected Lexeme The operation of the modeling component 208 during Step 412 is described in detail in this section. During step 412, the modeling component 208 performs an initialization step and a hidden Markov modeling step.

The modeling component 208 performs the initialization step to generate a single state mixture model (SSM). The modeling component 208 performs the initialization step according to the following steps:

1. The modeling component 208 repeats this step (that is, step 1) for n=1, 2. Starting with random cluster assignments, the modeling component 208 performs K-means Euclidean clustering of the projected vectors $\vec{r}_i^{(n)}$ obtained in Steps 8 and 9 of step 410, so as to obtain preliminary prototype distributions in the corresponding $R_n$-dimensional chirographic space.

2. The modeling component 208 repeats this step (that is, step 2) for n=1,2. Starting with the preliminary distributions of Step 1 of step 412 (initialization), the modeling component 208 performs K-means Gaussian clustering of the projected vectors $\vec{r}_i^{(n)}$ obtained in Steps 8 and 9 of step 410, so as to obtain final Gaussian prototype distributions in both chirographic spaces. The modeling component 208 denotes these prototype distributions as $\pi_k^{(n)}$ and uses cluster sizes to estimate the prior probability $Pr(\pi_k^{(n)})$ of each prototype distribution in the respective $R_n$-dimensional chirographic space.

3. The modeling component 208 repeats this step (that is, step 3) for n=1,2. Using the Gaussian distributions from Step 2 of step 412 (initialization), the modeling component 208 computes for all vectors $\vec{r}_i^{(n)}$ obtained in Steps 8 and 9 of step 410, the quantity $Pr(\vec{r}_i^{(n)}|\pi_k^{(n)})$. Also estimate the probability of each feature vector as:

$$Pr(\vec{r}_i^{(n)}) = \sum_{k=1}^{K_n} Pr(\vec{r}_i^{(n)}|\pi_k^{(n)})Pr(\pi_k^{(n)}),$$

assuming the total number of clusters in the respective chirographic space is $K_n$. Good choices are $K_1=K_2=400$.

4. The modeling component 208 repeats this step (that is, step 4) for n=1,2. Using the results of Steps 2 and 3 of step 412 (initialization), the modeling component 208 computes the quantity:

$$Pr(\pi_k^{(n)}|\vec{r}_i^{(n)}) = \frac{Pr(\vec{r}_i^{(n)}|\pi_k^{(n)})Pr(\pi_k^{(n)})}{Pr(\vec{r}_i^{(n)})}$$

and notes against which character $a_j$ each vector $\vec{r}_i^{(n)}$ is aligned in the training data.

5. The modeling component 208 repeats this step (that is, step 5) for n=1,2. For each character $a_j$ in the vocabulary considered, the modeling component 208 pools together all the $\vec{r}_i^{(n)}$ which have been aligned against it and accumulates the corresponding $Pr(\pi_k^{(n)}|\vec{r}_i^{(n)})$. After normalization, this provides an estimate of $Pr(\pi_k^{(n)}|a_j)$, the prior probability of each prototype distribution in the respective chirographic space given each character $a_j$.

The modeling component 208 performs the hidden Markov modeling step as follows.

Given T observation sequences, $x_1 \ldots x_T$ of a given lexeme the modeling component 208 obtains the corresponding HMM as follows. The length of the model L, is set to be slightly longer than that corresponding to the observation sequence closest in length to the average length of the observed sequences. This prototypical (in length) sequence is denoted by $\underline{x}$. The initial state transition probabilities are set to be uniform. The output probability distributions for transitions $t_1$ and $t_2$ for a given state are tied. As a result the modeling component 208 combines $p(x_t|s_i \rightarrow s_i)$ and $p(x_t|s_i \rightarrow s_{i+1})$ to form $p(x_t|s_i)$. This allows the modeling component 208 to estimate fewer parameters, thereby increasing the accuracy of the estimates.

Initially, the modeling component 208 assigns one Gaussian density distribution per codebook to each state (the first and second codebooks represent the spaces spanned by the $R_1$ and $R_2$ dimensional vectors of steps 8 and 9 of step 410, respectively). These are selected from the pool of Gaussians generated by the single state mixture model (SSM) (which was generated by the modeling component 208 during the initialization step). The selection is done on the basis of the cluster memberships $g_k$ of the individual frames of the observation sequence $\underline{x}$; the distribution "closest" to $\underline{x}^i$, i.e., the ith frame of $\underline{x}$, is assigned to state i of the model (distribution A is "closer" to a vector $\underline{x}$ than distribution B if $P(\underline{x}|A) > P(\underline{x}|B)$). Subsequently, the output distribution at each state is modeled as a mixture of the original Gaussian distributions.

Alternatively, the mixture coefficients may be initialized with the values obtained from the statistical mixture model. Since the latter is a single state model, initially all the states of the HMM would have identical sets of mixture coefficients.

Then, the modeling component 208 updates the model parameters by performing Viterbi alignment of the observation sequences to the model. The Viterbi algorithm is generally described in F Jelinek, "The Development of an Experimental Discrete Dictation Recognizer," *Proc. IEEE*, Vol. 73, No. 11, pages 1616–1623 (November 1985), which is herein incorporated by reference in its entirety.

Alternatively, the modeling component 208 may update the model parameters by using a well-known maximum likelihood alignment of the observation sequences of the model. This is also described in Jelinek, which was cited above.

For each training observation sequence, the modeling component 208 determines the most probable path through the model. The parameters are updated based on the relative frequencies of the various states transitions and of the observed values emitted during these transitions. The probability of observing a given feature vector $x_t$ at any state j is given by the following equation:

$$p(\underline{x}_t|S_j) = \left( \sum_k p(\underline{x}_t|g_k^1)p(g_k^1|s_j) \right)^{1-\alpha} * \left( \sum_k p(\underline{x}_t|g_k^2)p(g_k^2|s_j) \right)^{\alpha}$$

For computational reasons in the preferred embodiment, the original set of Gaussian distributions remains unchanged throughout the training procedure; only the mixture coefficients that characterize each state are reestimated. But extension is straightforward and should be obvious to one skilled in the art. The distributions could be updated (that is, reestimated), using the following equations:

$$E[\underline{x}_{t_i}] = \frac{\sum_j \sum_{t:x_t \in S_j} \frac{p(g_i|s_j) \cdot p(\underline{x}_t|g_i) \cdot x_{t_i}}{p(\underline{x}_t|S_j)}}{\sum_j \sum_{t:x_t \in S_j} \frac{p(g_i|S_j) \cdot P(\underline{x}_t|g_i)}{p(\underline{x}_t|S_j)}}$$

$$\sigma_{ij}^2 = E[\underline{x}_{t_i}\underline{x}_{t_j}^T] - E[\underline{x}_{t_i}] * E[\underline{x}_{t_j}^T]$$

where $x_{t_i}$ is the ith component of the vector $\underline{x}_t$ and $E[\underline{x}_{t_i}]$ is its expected value. $\sigma_{ij}^2$ is the variance of distribution.

The mixture coefficients, $p(g_k|s_j)$ and the transition probabilities $p(s_i \rightarrow s_j)$ are updated at each iteration. According to the preferred embodiment, the mixture coefficients are updated as follows:

$$p(g_k|s_j) = \frac{\sum_{x_l \in s_j} P(g_k|x_l)}{\sum_{x_l \in s_j} \sum_k P(g_k|x_l)}$$

The mixture coefficients may also be updated according to either of the following equations:

$$p(g_k|s_j) = \frac{p(g_k, s_j)}{\sum_k p(g_k, s_j)}$$

$$p(g_k|s_j) = \frac{p(g_k, s_j)}{p(s_j)}$$

Likewise, the transition probabilities are reestimated by:

$$P(s_i \to s_j) = \frac{\text{Number of occurrences of trans. } i \to j}{\text{Number of times the state } i \text{ was visited}}$$

In general, 3 to 4 iterations are sufficient for the parameters to converge.

3. Decoding/Testing Phase

Figure 5:
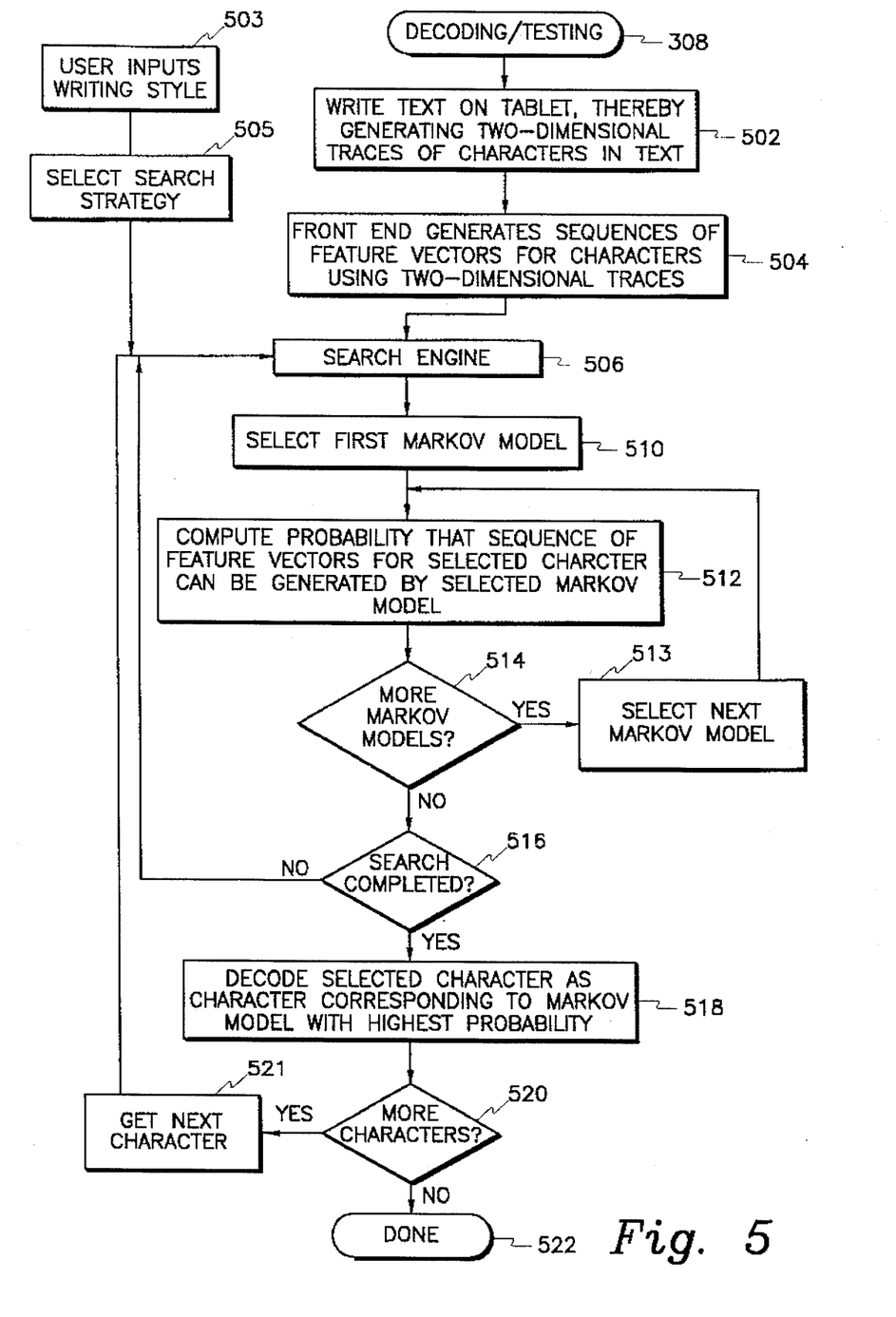
FIG. 5 illustrates the operation of the present invention during a decoding phase.

FIG. 5 illustrates a decoding/testing flow chart which represents the operation of the handwriting recognition program 202 during step 308 (see FIG. 3).

In step 502, the computer platform 210 receives text which a user enters on the electronic tablet 226 by using the stylus 232. The text entered by the user is received by the handwriting recognition program 202 in the form of two-dimensional traces.

In step 503, the user selects the writing style corresponding to the text of the step 502. This information is essential to the search engine (step 506).

In step 504, the front end 206 generates, for each character in the text, a sequence of feature vectors by using the associated two-dimensional trace. The operation of the front end 206 during step 504 is the same as the operation of the front end 206 during step 410, with the exception that step 7 is not performed. Steps 8 and 9 are performed using the eigenvectors generated in step 410 (step 7) of the training phase.

In step 505, the search strategy is selected on the basis of the information in step 503. In the case of discrete writing the search strategy is considerably simplified.

In steps 506 and 516 the appropriate search engine is invoked. In the case of discrete writing, the sequence of feature vectors for each character is known. Therefore the "search" is limited to this sequence. In other cases, a well-known A* type search algorithm is employed. The A* search algorithm is described in Nilsson, N. J., *Learning Machines*, Ch. 4, McGraw Hill, New York, N.Y., 1965, which is herein incorporated by reference in its entirety.

For example, a suitable A* search algorithm is described in U.S. Pat. No. 4,731,857 to Tappert, which is herein incorporated by reference in its entirety.

In step 510, the handwriting recognition program 202 selects the first hidden Markov models to process. Recall that the hidden Markov models were generated during the training phase 306 such that there is a hidden Markov model for each lexeme identified in step 304 (see FIG. 3).

In step 512, the modeling component 208 computes and stores the probability that the sequence of feature vectors for the selected character was generated by the selected hidden Markov model. In other words, during step 512, the modeling component 208 calculates the a posteriori probability for the character with regard to the selected HMM.

In the preferred embodiment, the modeling component 208 performs step 512 by using the Viterbi algorithm. The total probability of the observed (test) sequence given a particular model, $\lambda_i$, is approximated by the probability of the most likely path of the sequence through the selected hidden Markov model. In practice, this term is the dominant term and yields a reasonable approximation of the total probability. This is denoted as $\hat{p}(\underline{x}_{test}|\lambda_i)$.

Alternatively, the modeling component 208 may perform step 512 by using a well-known maximum likelihood algorithm. In this alternate case, no approximation is made.

In step 514, the handwriting recognition program 202 determines whether there are any more hidden Markov models to process for the selected character. If there are more hidden Markov models to process, the handwriting recognition program 202 selects the next hidden Markov model (in step 513), and then loops back to step 512. Otherwise, the handwriting recognition program 202 performs step 516.

Step 516 is related to step 506 and is part of the search engine. It is described above.

If, in step 516, the search is completed, then the handwriting recognition program 202 would perform step 518. Otherwise, the handwriting recognition program 202 would loop back to step 506.

In step 518, the handwriting recognition program 202 would decode the selected character as the character corresponding to the Markov model which yielded the highest probability in step 512. Specifically, during step 518, the modeling component 208 determines that the recognized character is the one that maximizes the a posteriori probabilities calculated in step 512:

$$\hat{l} = f\left( \arg\max_i \hat{p}(\underline{x}_{test}|\lambda_i) \right)$$

where f maps the lexeme identity, $\lambda_i$, to its associated discrete character, $\hat{l}$.

In step 520, the handwriting recognition program 202 determines whether there are any more characters to process. If there are no more characters to process, then the decoding/testing phase 308 is complete. Otherwise, the handwriting recognition program 202 performs step 521 to select the next character and then loops back to step 506.

While the invention has been particularly shown and described with reference to preferred embodiments thereof, it will be understood by those skilled in the art that various changes in form and details may be made therein without departing from the spirit and scope of the invention.

Having thus described our invention, what we claim as new and desire to secure by Letters Patent is:

1. A computer-based method for recognizing handwriting, wherein the computer comprises an input device, a memory module, a preprocessor unit, a front end unit and a modeling component, the method comprising the steps of:

(1) receiving character signals into the preprocessor unit from the input device, said character signals representing training observation sequences of sample characters;

(2) sorting said character signals in the preprocessor unit according to lexemes which represent different writing styles for a given character, by mapping said character signals in lexographic space, said lexographic space being a location in the memory module which contains one or more character-level feature vectors, to find high-level variations in said character signals;

(3) selecting one of said lexemes;

(4) generating sequences of feature vector signals in the front end unit representing feature vectors for said character signals associated with said selected lexeme by mapping in chirographic space, said chirographic space being a location in the memory module which contains one or more flame-level feature vectors; and (5) generating a Markov model signal in the modeling component representing a hidden Markov model for said selected lexeme, said hidden Markov model having model parameter signals and one or more states, each of said states having emission transitions and non-emission transitions, wherein said step (5) comprises the steps of:

(i) initializing said model parameter signals comprising the steps of:

(a) setting a length for said hidden Markov model;

(b) initializing state transition probabilities of said hidden Markov model to be uniform;

(c) for each of said states, tying one or more output probability distributions for said emission transitions;

(d) for each of said states, assigning a Gaussian density distribution for each of one or more codebooks; and (e) alternatively initializing one or more mixture coefficients to be values obtained from a statistical mixture model; and (ii) updating said model parameter signals.

2. The method of claim 1, further comprising the step of:

(6) generating individual hidden Markov models for all lexemes by performing steps (3)–(5) for each of said lexemes.

3. The method of claim 2, further comprising the steps of:

(7) receiving test characters;

(8) generating sequences of feature vectors for said test characters by mapping in chirographic space;

(9) selecting one of said test characters;

(10) computing probabilities that said selected test character can be generated by said hidden Markov models;

(11) selecting one of said hidden Markov models having a greatest probability; and (12) decoding said selected test character as a recognized character associated with said selected hidden Markov model.

4. The method of claim 3, further comprising the step of:

(13) performing steps (9)–(12) for each of said test characters.

5. The method of claim 1, wherein said step (a) comprises the steps of:

determining an average length of observed sequences;

identifying one of said observed sequences closest in length to said average length; and setting a length for said hidden Markov model to a value longer than said identified observed sequence.

6. The method of claim 1, wherein step (d) comprises the steps of:

generating multiple Gaussian density distributions by using said statistical mixture model;

for each of said states, selecting one of said Gaussian density distributions based on cluster memberships $g_k$ of individual frames of an observation sequence; and alternatively initializing mixture coefficients to be values obtained from said statistical mixture model.

7. The method of claim 1, wherein said step (ii) comprises the step of performing Viterbi alignment of observation sequences to update said model parameters.

8. The method of claim 1, wherein said step (ii) comprises the steps of:

(a) accumulating probabilities of each state transition and each observed value corresponding to all possible paths through said hidden Markov model for each training observation sequence; and (b) updating said model parameters based on relative frequencies of said state transitions and on observed values emitted during said state transitions.

9. The method of claim 1, wherein said step (ii) comprises the steps of:

(a) determining a most probable path through said hidden Markov model for each training observation sequence; and (b) updating said model parameters based on relative frequencies of state transitions and on observed values emitted during said state transitions.

10. The method of claim 9, wherein step (b) comprises the steps of:

(I) updating said one or more output probability distributions;

(II) updating said one or more mixture coefficients; and (III) updating state transition probabilities.

11. The method of claim 10, wherein said step (I) comprises the step of determining a probability of observing a feature vector $x_t$ at a state j according to an equation:

$$p(\underline{x}_t|s_j) = \left( \sum_k p(\underline{x}_t|g_k^1)p(g_k^1|s_j) \right)^{1-\alpha} * \left( \sum_k p(\underline{x}_t|g_k^2)p(g_k^2|s_j) \right)^{\alpha}$$

where: "$x_t$" is one of one or more feature vectors which are grouped into one or more clusters; "$s_j$" is a state of said hidden markov model; "k" is the total number of said feature vector clusters; "$g_k^1$" is one of said one or more clusters; "$g_k^2$" is one of said one or more clusters; and "$\alpha$" is a weighting term.

12. The method of claim 10, wherein said step (II) comprises the step of updating mixture coefficients according to an equation:

$$p(g_k|s_j) = \frac{p(g_k, s_j)}{p(s_j)}$$

where "$s_j$" is a state of said hidden markov model, and "$g_k$" is one of one or more clusters of feature vectors.

13. The method of claim 10, wherein step (III) comprises the step of updating state transition probabilities according to an equation:

$$P(s_i \to s_j) = \frac{\text{Number of occurrences of trans. } i \to j}{\text{Number of times the state } i \text{ was visited}}$$

where "$s_j$" is a state of said hidden markov model and "$s_j$" is a state of said hidden markov model.

14. The method of claim 10, further comprising the step of:

(IV) repeating steps (II)–(III) during each iteration.

15. The method of claim 3, wherein said step (10) comprises the step of applying a Viterbi algorithm to calculate, a posteriori, probabilities that said selected test character can be generated by said hidden Markov models.

16. The method of claim 3, wherein said step (10) comprises the step of applying a maximum likelihood algorithm to calculate, a posteriori, probabilities that said selected test character can be generated by said hidden Markov models.

17. A computer-based system for recognizing handwriting, the computer comprising an input device, a memory module, a preprocessor unit, a front end unit and a modeling component, the system comprising:

(a) means for receiving character signals into the preprocessor unit from the input device representing training observation sequences of sample characters;

(b) means for sorting said character signals in the preprocessor unit according to lexemes which represent different writing styles for a given character, by mapping said sample characters in lexographic space, said lexographic space being a location in the memory module which contains one or more character-level feature vectors, to find high-level variations in said character signals;

(c) means for generating sequences of feature vector signals in the front end unit representing feature vectors for said character signals by mapping in chirographic space, said chirographic space being a location in the memory module which contains one or more frame-level feature vectors;

(d) means for generating Markov model signals in the modeling component representing hidden Markov models for said lexemes, each of said hidden Markov models having model parameter signals and one or more states, each of said states having emission transitions and non-emission transitions, wherein said generating means comprises:

(i) means for initializing said model parameter signals in each of said hidden Markov models, said initializing means comprising:
means for setting a length for said hidden Markov model;
means for initializing state transition probabilities of said hidden Markov model to be uniform;
means for tying one or more output probability distributions for said emission transitions for each of said states;
means for assigning a Gaussian density distribution for each of one or more codebooks for each of said states; and
means for alternatively initializing one or more mixture coefficients to be values-obtained from a statistical mixture model; and (ii) means for updating said model parameter signals in each of said hidden Markov models.

18. The system of claim 17, further comprising:

(e) means for receiving test characters;

(f) means for generating sequences of feature vectors for said test characters by mapping in chirographic space;

(g) means for computing probabilities that said test characters can be generated by said hidden Markov models; and (h) means for decoding said test characters as recognized characters associated with said selected hidden Markov models having greatest probabilities.

19. The system of claim 17, wherein said updating means comprises a means for performing Viterbi alignment of observation sequences to update said model parameters.

20. The system of claim 17, wherein said updating means comprises:

means for accumulating probabilities of each state transition and each observed value corresponding to all possible paths through said hidden Markov model for each training observation sequence; and means for updating said model parameters based on relative frequencies of said state transistions and on observed values emitted during said state transitions.

21. The system of claim 17, wherein said updating means comprises:

(1) means for determining a most probable path through said hidden Markov model for each training observation sequence;

(2) means for updating said model parameters based on relative frequencies of state transitions and on observed values emitted during said state transitions, comprising:
(I) means for updating said one or more output probability distributions;
(II) means for updating said one or more mixture coefficients; and
(III) means for updating state transition probabilities.

22. The system of claim 21, wherein said means for updating output distributions comprises means for determining a probability of observing a feature vector $x_t$ at a state $j$ according to an equation:

$$p(\underline{x}_t|s_j) = \left( \sum_k p(\underline{x}_t|g_k^1) p(g_k^1|s_j) \right)^{1-\alpha} * \left( \sum_k p(\underline{x}_t|g_k^2) p(g_k^2|s_j) \right)^{\alpha}$$

where: "$x_t$" is one of one or more feature vectors which are grouped into one or more clusters; "$s_j$" is a state of said hidden markov model; "k" is the total number of said feature vector clusters; "$g_k^1$" is one of said one or more clusters; "$g_k^2$" is one of said one or more clusters; and "$\alpha$" is a weighting term.

23. The system of claim 21, wherein said means for updating mixture coefficients comprises means for updating mixture coefficients according to an equation:

$$p(g_k|s_j) = \frac{p(g_k, s_j)}{p(s_j)}$$

where "$s_j$" is a state of said hidden markov model, and "$g_k$" is one of one or more clusters of feature vectors.

24. The system of claim 21, wherein said means for updating state transition probabilities comprises means for updating state transition probabilities according to an equation:

$$P(s_i \rightarrow s_j) = \frac{\text{Number of occurrences of trans. } i \rightarrow j}{\text{Number of times the state } i \text{ was visited}}$$

where "$s_i$" is a state of said hidden markov model and "$s_j$" is a state of said hidden markov model.

25. The system of claim 18, wherein said computing means comprises means for applying a Viterbi algorithm to calculate, a posteriori, probabilities that said selected test character can be generated by said hidden Markov models.

26. The system of claim 18, wherein said computing means comprises means for applying a maximum likelihood algorithm to calculate, a posteriori, probabilities that said selected test character can be generated by said hidden Markov models.

* * * * *